(12) United States Patent
Kudo

(10) Patent No.: US 7,567,687 B2
(45) Date of Patent: Jul. 28, 2009

(54) OUTSIDE-VEHICLE MONITORING SYSTEM

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 287 days.

(21) Appl. No.: 11/058,305

(22) Filed: Feb. 14, 2005

(65) Prior Publication Data

US 2005/0231339 A1    Oct. 20, 2005

(30) Foreign Application Priority Data

Feb. 17, 2004    (JP) .............................. 2004-040227

(51) Int. Cl.
G06K 9/00 (2006.01)
B60Q 1/00 (2006.01)
H04N 7/18 (2006.01)

(52) U.S. Cl. ...................... 382/103; 382/104; 340/435; 348/148

(58) Field of Classification Search ............ 340/636.18, 340/435; 382/103, 104; 348/148
See application file for complete search history.

(56) References Cited

U.S. PATENT DOCUMENTS

| | | | |
|---|---|---|---|
| 5,233,527 A * | 8/1993 | Shinnosuke .................. 701/28 |
| 5,251,036 A * | 10/1993 | Kawaoka et al. ............ 348/311 |
| 5,414,493 A * | 5/1995 | Fujii et al. .................. 399/112 |
| 5,555,312 A * | 9/1996 | Shima et al. ................. 382/104 |
| 5,561,460 A * | 10/1996 | Katoh et al. ............. 348/219.1 |
| 5,850,254 A * | 12/1998 | Takano et al. ............... 348/148 |
| 5,963,148 A * | 10/1999 | Sekine et al. ............... 340/905 |
| 6,088,468 A * | 7/2000 | Ito et al. ..................... 382/103 |
| 6,184,782 B1 * | 2/2001 | Oda et al. ................... 340/435 |
| 6,281,806 B1 * | 8/2001 | Smith et al. ................. 340/901 |
| 6,327,522 B1 * | 12/2001 | Kojima et al. .................. 701/1 |
| 6,363,326 B1 * | 3/2002 | Scully ........................ 701/301 |

(Continued)

FOREIGN PATENT DOCUMENTS

DE    43 08 776 A1    9/1993

(Continued)

OTHER PUBLICATIONS

Howe, D. "Solid State Storage Device"—www.babylon.com/definition/solid-state_storage_device/English. Dec. 31, 2001. p. 1 of 1.*

(Continued)

*Primary Examiner*—Andrew W Johns
*Assistant Examiner*—Mia M Thomas
(74) *Attorney, Agent, or Firm*—Darby & Darby P.C.

(57) ABSTRACT

The present invention includes a stereo camera for picking up a couple of images of outside a vehicle and a far-infrared sensor for detecting the temperature of an object outside the vehicle at least in a detection field overlapping a view field of the stereo camera in the vehicle-width direction. A stereo-image processing unit recognizes three-dimensional objects based on the couple of images and extracts a prospective pedestrian from the recognized three-dimensional objects. A pedestrian-determination unit determines whether or not the prospective pedestrian is a real pedestrian based on a temperature-detection value detected in the same direction the prospective pedestrian exists, where the temperature-detection value is obtained through the far-infrared sensor.

2 Claims, 4 Drawing Sheets

U.S. PATENT DOCUMENTS

| | | | |
|---|---|---|---|
| 6,531,959 B1 | 3/2003 | Nagaoka et al. | |
| 6,535,242 B1 | 3/2003 | Strumolo et al. | |
| 6,728,393 B2 * | 4/2004 | Stam et al. | 382/104 |
| 6,734,787 B2 * | 5/2004 | Ikeda | 340/425.5 |
| 6,784,792 B2 * | 8/2004 | Mattes et al. | 340/436 |
| 6,897,892 B2 * | 5/2005 | Kormos | 348/148 |
| 7,016,519 B1 * | 3/2006 | Nakamura et al. | 382/106 |
| 7,061,401 B2 * | 6/2006 | Voos et al. | 340/961 |
| 7,130,448 B2 * | 10/2006 | Nagaoka et al. | 382/104 |
| 7,139,411 B2 * | 11/2006 | Fujimura et al. | 382/103 |
| 7,141,796 B2 * | 11/2006 | Hattori et al. | 250/370.08 |
| 7,366,325 B2 * | 4/2008 | Fujimura et al. | 382/104 |
| 2002/0001398 A1 * | 1/2002 | Shimano et al. | 382/104 |
| 2002/0126002 A1 * | 9/2002 | Patchell | 340/436 |
| 2003/0007074 A1 * | 1/2003 | Nagaoka et al. | 348/148 |
| 2003/0043029 A1 * | 3/2003 | Ichikawa et al. | 340/435 |
| 2003/0083790 A1 * | 5/2003 | Hattori et al. | 701/1 |
| 2003/0138133 A1 * | 7/2003 | Nagaoka et al. | 382/104 |
| 2003/0202089 A1 | 10/2003 | Alhadef et al. | |
| 2004/0252862 A1 * | 12/2004 | Camus et al. | 382/104 |
| 2005/0063565 A1 * | 3/2005 | Nagaoka et al. | 382/104 |
| 2005/0276447 A1 * | 12/2005 | Taniguchi et al. | 382/103 |
| 2006/0115120 A1 * | 6/2006 | Taniguchi et al. | 382/104 |
| 2006/0115123 A1 * | 6/2006 | Kanai et al. | 382/104 |
| 2006/0119473 A1 * | 6/2006 | Gunderson et al. | 340/435 |
| 2006/0126896 A1 * | 6/2006 | Nagaoka et al. | 382/103 |
| 2006/0250224 A1 * | 11/2006 | Steffel et al. | 340/435 |

FOREIGN PATENT DOCUMENTS

| | | |
|---|---|---|
| DE | 196 09 488 A1 | 10/1996 |
| DE | 196 50 756 A1 | 6/1997 |
| EP | 1 491 978 A1 | 12/2004 |
| JP | 05/265547 A | 10/1993 |
| JP | 2000-329844 A | 11/2000 |
| JP | 2002-074595 | 3/2002 |
| JP | 2003-288600 | 10/2003 |
| JP | 2003-302470 | 10/2003 |

OTHER PUBLICATIONS

Visual Light Definition.*

* cited by examiner

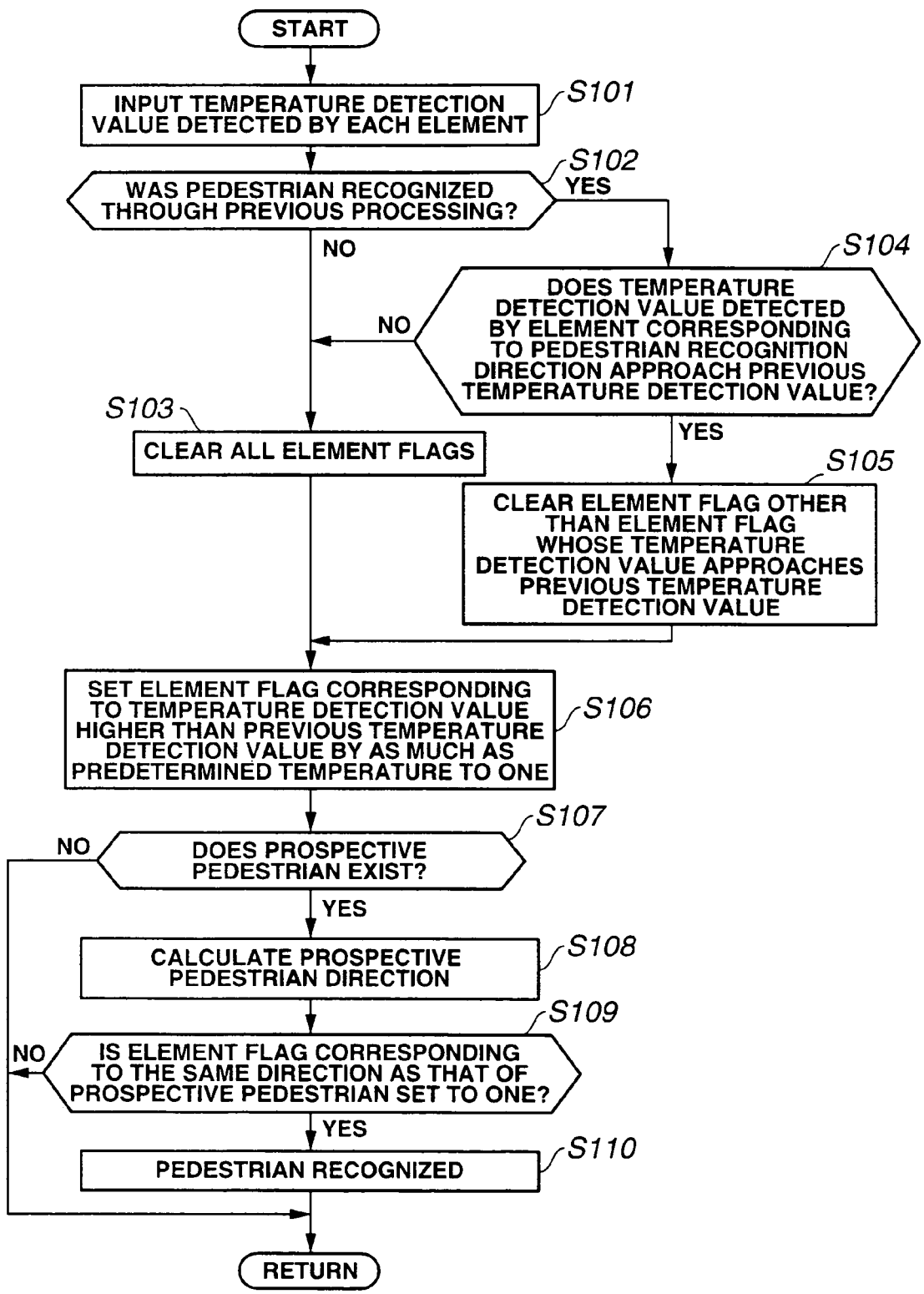

OUTSIDE-VEHICLE MONITORING SYSTEM

CROSS REFERENCE TO RELATED APPLICATIONS

This application claims benefit of Japanese Application No. 2004-040227 filed on Feb. 17, 2004, the contents of which are incorporated by this reference.

BACKGROUND OF THE INVENTION

1. Field of the Invention

The present invention relates to an outside-vehicle monitoring system for recognizing a three-dimensional object forward of a vehicle and particularly relates to an outside-vehicle monitoring system for recognizing a pedestrian forward of the vehicle with high precision.

2. Description of the Related Art

Hitherto, various types of outside-vehicle monitoring systems for recognizing the environment forward of a traveling vehicle have been proposed for supporting and controlling the driving of the vehicle, for example. Japanese Unexamined Patent Application Publication No. 5-265547 discloses an example of technology for processing a couple of images picked up by a couple of CCD cameras (a stereo optical system), calculating the distance distribution over the entirety of both images, grouping the distance-distribution data into a plurality of units, and comparing the grouped distance distribution units to three-dimensional road-shape data, three-dimensional object data, and so forth that had already been stored, so as to recognize roads and three-dimensional objects forward of the vehicle.

It is especially demanded that the outside-vehicle systems data representing the pedestrian with high precision from recognized data representing other three-dimensional objects, so that during driving contact is avoided between the vehicle and the pedestrian with increased reliability by using a driving-support control system or the like. However, according to the technology disclosed in the above-described Patent Application Publication, the pedestrian data extraction is performed on the basis of the width, height, and so forth of a recognized three-dimensional object in three dimensions. Therefore, it was difficult to extract pedestrian data with sufficient precision.

For solving the above-described problem, for example, Japanese Unexamined Patent Application Publication No. 2000-329844 discloses a technology for recognizing the pedestrian by having the pedestrian carry a predetermined portable transmitter-receiver with him/her for shifting the frequency of a received radar signal by as much as a predetermined period and transmitting the shifted frequency, and by transmitting and receiving radar signals between the vehicle and the portable transmitter-receiver through an on-board transmitter-receiver.

However, according to the above-described technology, it is necessary that all pedestrians carry the above-described portable transmitter-receiver with them, so that all of the pedestrians forward of the vehicle can be recognized.

SUMMARY OF THE INVENTION

Accordingly, it is an object of the present invention to provide an outside-vehicle monitoring system having a simple configuration for recognizing a pedestrian with high precision.

According to an aspect of the present invention, an outside-vehicle monitoring system includes an image-pickup means for picking up the image of an object outside a vehicle and a three-dimensional-object recognition means for recognizing one three-dimensional object outside the vehicle by processing the image picked up by the image-pickup means and extracting data relating to one prospective pedestrian from the recognized three-dimensional object. The outside-vehicle monitoring system comprises at least a temperature-detection means for detecting the temperature of a predetermined detection field overlapping a predetermined field of view of the image-pickup means in a vehicle-width direction and a pedestrian-determination means for determining whether or not the prospective pedestrian is a pedestrian according to fluctuations in the value of the detected temperature in the same direction as the prospective pedestrian.

BRIEF DESCRIPTION OF THE DRAWINGS

FIG. 4 is a flowchart illustrating a pedestrian-determination routine.

DETAILED DESCRIPTION OF PREFERRED EMBODIMENTS

Figure 1:
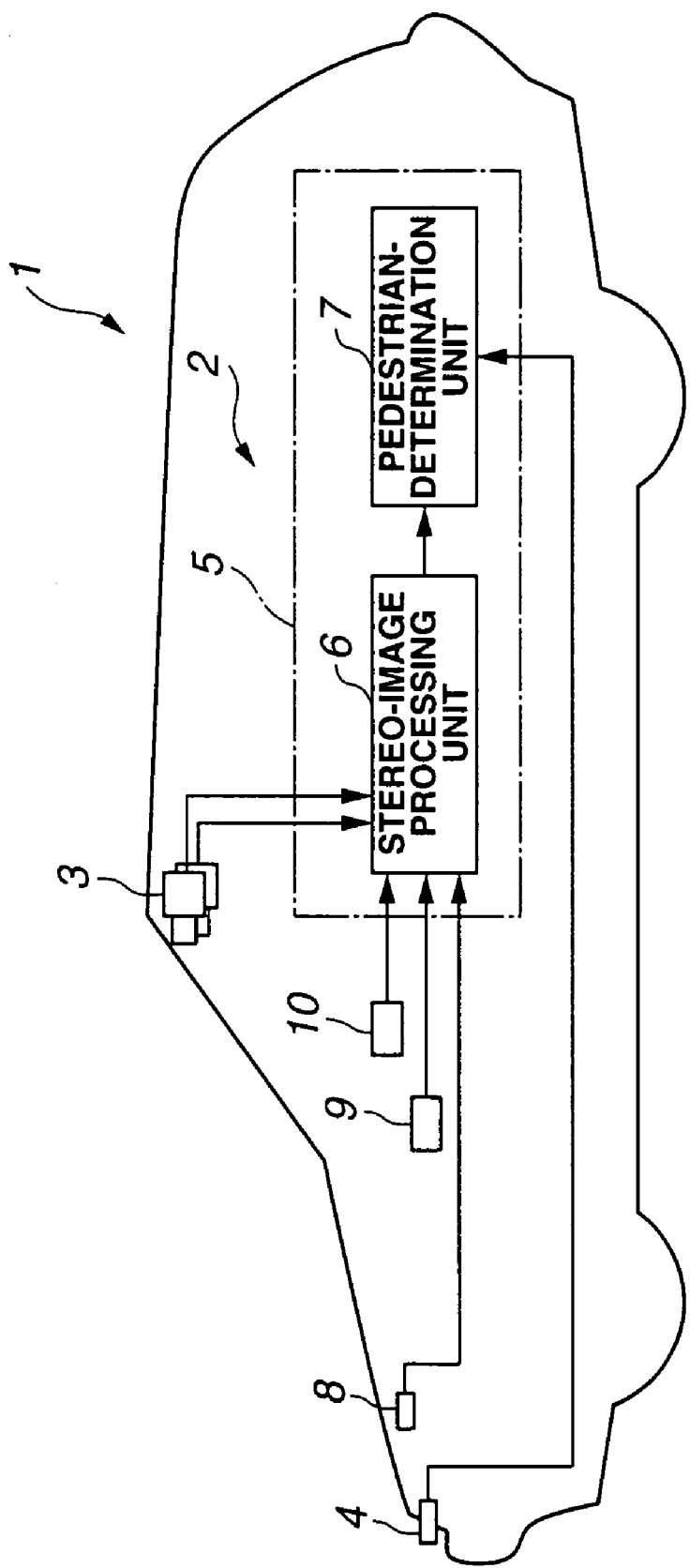
FIG. 1 schematically shows the configuration of an outside-vehicle monitoring system.
Figure 2:
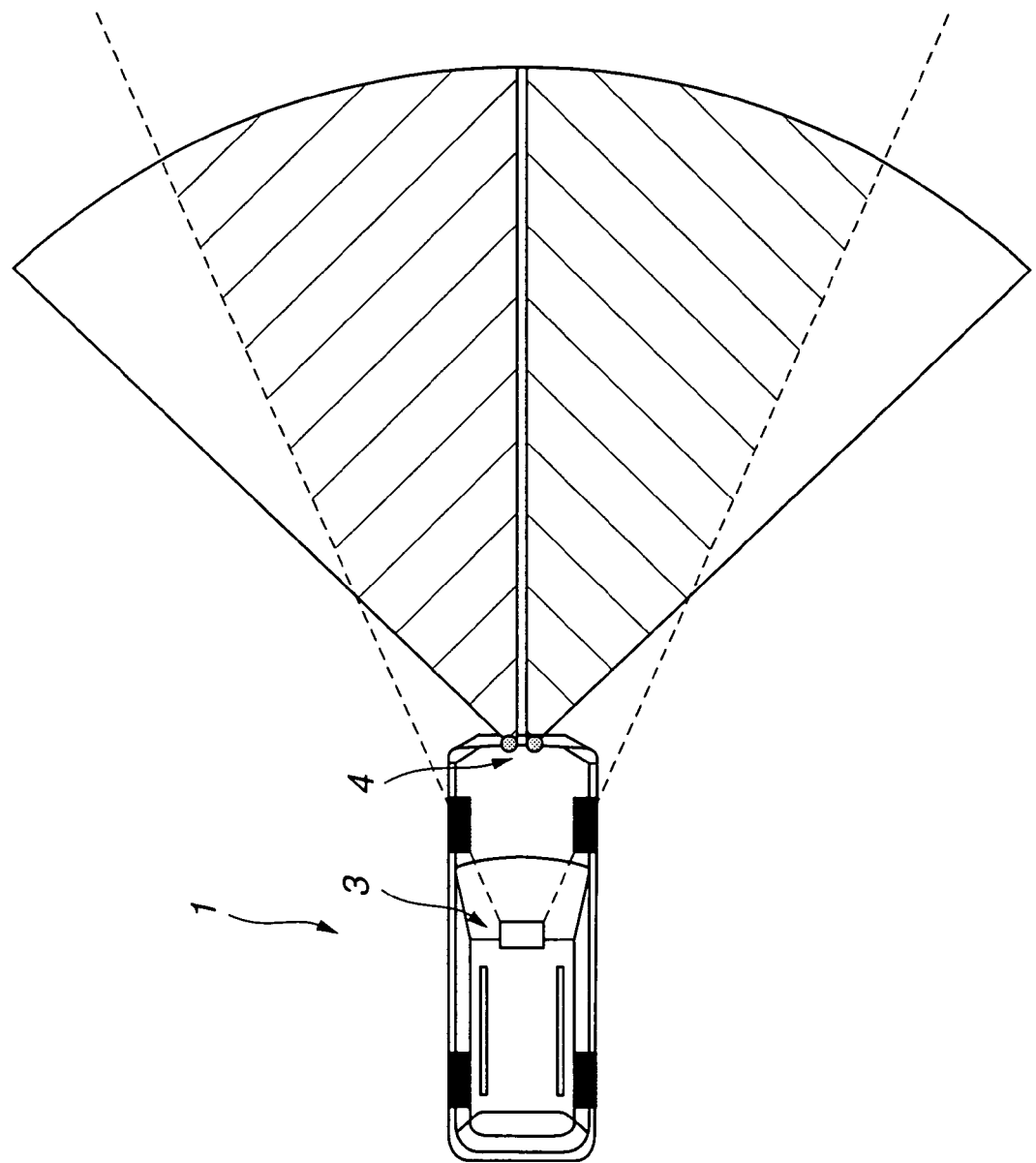
FIG. 2 illustrates a field of view of CCD cameras and a temperature-detection field of a far-infrared sensor in the vehicle-width direction.
Figure 3:
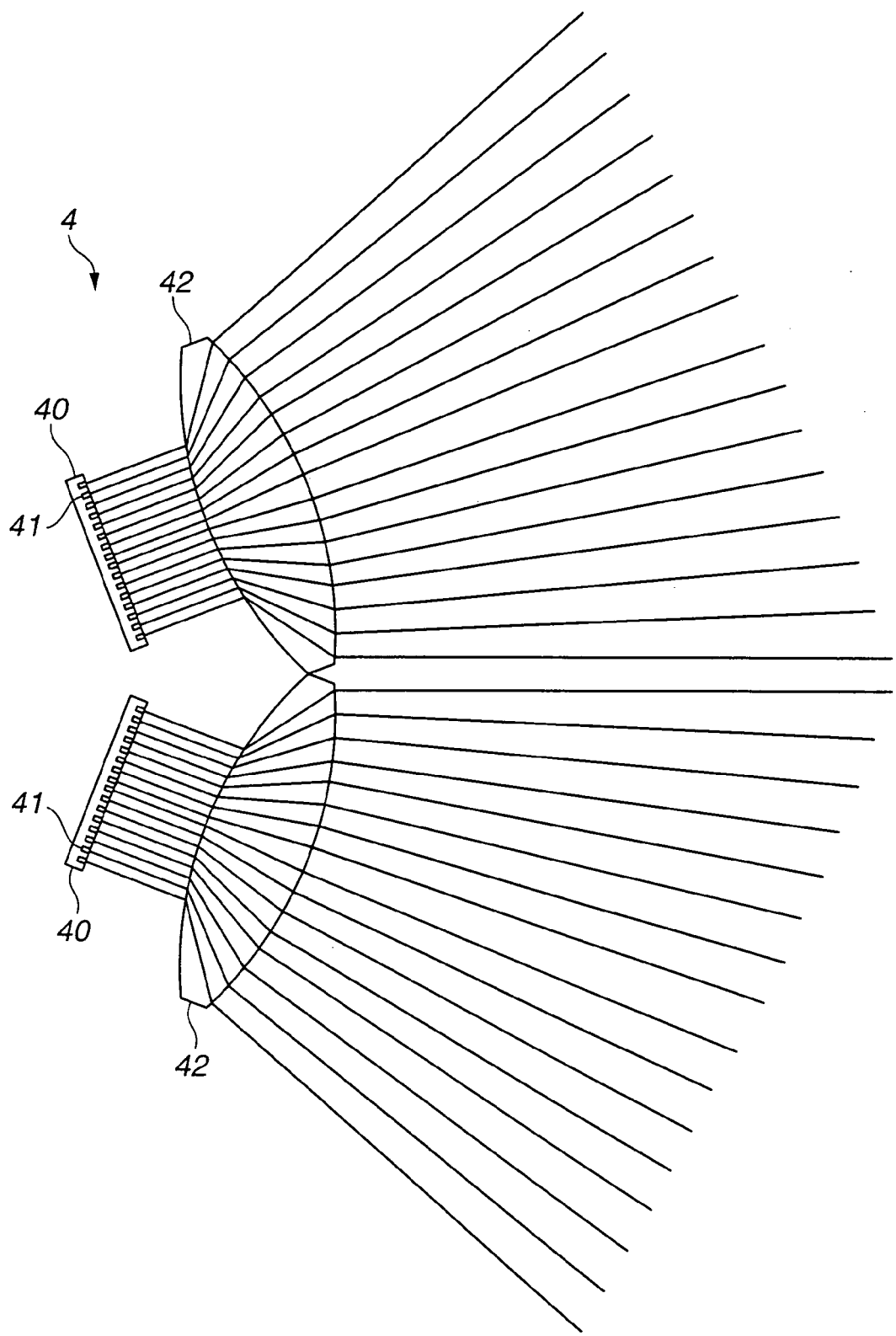
FIG. 3 schematically shows the configuration of the far-infrared sensor.

Preferred embodiments of the present invention will now be described with reference to the attached drawings. FIG. 1 schematically shows the configuration of the outside-vehicle monitoring system. FIG. 2 illustrates a field of view of CCD cameras and a temperature-detection field of the far-infrared sensor in the vehicle-width direction. FIG. 3 schematically shows the configuration of the far-infrared sensor. FIG. 4 is the flowchart illustrating the pedestrian-determination routine.

In FIG. 1, reference numeral 1 denotes a vehicle such as an automobile having an outside-vehicle monitoring device 2 mounted thereon. The outside-vehicle monitoring device 2 includes a stereo camera 3 functioning as an image-pickup means, a far-infrared sensor 4 functioning as a temperature-detection means, and a forward-information recognition device 5.

The stereo camera 3 includes a pair of (right and left) CCD cameras using solid-state image-pickup elements such as charge coupled devices (CCD). For example, the right and left CCD cameras are attached to the front portion of a ceiling of a cabin of the vehicle with a predetermined distance therebetween. Therefore, the CCD cameras pick up the image of an object outside and forward of the vehicle 1 from different points of view and output a signal related thereto to the forward-information recognition device 5.

The far-infrared sensor 4 is attached to a front bumper of the vehicle 1, for example, as shown in FIGS. 1 and 2. The far-infrared sensor 4 detects the temperature of an object outside the vehicle 1 for each set direction in at least a predetermined detection field overlapping the field of view of the stereo camera 3 in the vehicle-width direction. Further, the far-infrared sensor 4 outputs a signal to the forward-information recognition device 5 that is related to the temperature in the detection field. In FIG. 2, an area that is forward of the vehicle 1 and defined by broken lines represents the field of view of the stereo camera 3 in the vehicle-width direction. An area that is forward of the vehicle 1 and surrounded by a solid line represents be the temperature-detection field of the far-infrared sensor 4. Further, a hatched area shown in this drawing indicates an area where the field of view of camera 3 and the temperature-detection field of sensor 4 overlap each other. The far-infrared sensor 4 includes a pair of element substrates 40 (FIG. 3). Each of the element substrates 40 includes sixteen thermal infrared elements 41 aligned in a horizontal direction. Each of the thermal infrared elements 41 is formed as a thermopile sensor for detecting heat through a thermocouple. The far-infrared sensor 4 further includes a pair of lenses 42 that are opposite the element substrates 40, respectively. The thermal infrared elements 41 detect temperatures corresponding to thirty-two directions that are set forward of the vehicle 1.

The forward-information recognition device 5 includes a stereo-image processing unit 6 functioning as a three-dimensional-object recognition unit and a pedestrian-determination unit 7 (FIG. 1).

The stereo-image processing unit 6 is connected to the above-described stereo camera 3, a vehicle-speed sensor 8, a steering-wheel-angle sensor 9, and a yaw-rate sensor 10. A vehicle speed signal $V_0$, a steering-wheel angle signal H, and a yaw rate signal γ are input via the vehicle-speed sensor 8, the steering-wheel-angle sensor 9, and the yaw-rate sensor 10, respectively.

The stereo-image processing unit 6 recognizes forward information such as data on a three-dimensional object forward of the vehicle 1, side-wall data, and white-line data according to a couple of images obtained through the stereo camera 3. Then, the stereo-image processing unit 6 estimates the travel direction of the vehicle 1 (the vehicle travel route) according to the above-described forward information and the driving state (the steering-wheel angle H and the yaw rate γ) of the vehicle 1. Further, the stereo-image processing unit 6 estimates the driving area of the vehicle 1, which is equipped with the monitor according to the estimated vehicle travel route and the forward information, detects any preceding vehicle forward of the equipped vehicle 1 based on the vehicle driving area, the distance between the equipped vehicle 1 and the preceding vehicle, and so forth. It then calculates the following distance, the preceding-vehicle speed (=relative speed+vehicle speed), and so forth, and obtains various types of data, such as the position of a three-dimensional object other than the preceding vehicle in the equipped vehicle driving area. Further, the stereo-image processing unit 6 extracts data concerning a prospective pedestrian from the recognized three-dimensional objects (three-dimensional-object data) based on the width or the like of each of the recognized three-dimensional objects in the real space.

The stereo-image processing unit 6 processes an image obtained through the stereo camera 3 in the following manner. That is to say, the stereo-image processing unit 6 obtains distance information of the entire image according to the principle of triangulation based on the amount of displacement between positions corresponding to one another for a couple of images picked up by the CCD cameras of the stereo camera 3. Then, the stereo-image processing unit 6 generates a distance image showing the three-dimensional distance distribution. Further, the stereo-image processing unit 6 groups the generated distance-image data into a plurality of units in a known manner, compares the grouped distance-distribution data units to three-dimensional road-shape data, three-dimensional-object data, and so forth that had already been stored, so that white lines, guardrails provided along the road, sidewalls such as curbs, three-dimensional objects such as vehicles, pedestrians, and so forth are recognized. Data on the recognized three-dimensional object includes, for example, the width of the three-dimensional object and the distance between the vehicle 1 and the three-dimensional object in the real space, changes in the distance over time (a relative speed to the vehicle 1), and so forth. The stereo-image processing unit 6 extracts a three-dimensional object nearest to the vehicle 1 in the vehicle driving area from among three-dimensional objects traveling at a predetermined speed in substantially the same direction as the vehicle 1. Further, the stereo-image processing unit 6 extracts a predetermined three-dimensional object whose width in the real space falls within a predetermined set range (the range of 300 to 800 mm, for example) from between three-dimensional objects in the vehicle driving area and three-dimensional objects expected to enter the vehicle driving area, as the prospective pedestrian, and outputs the data of the prospective pedestrian to the pedestrian-determination unit 7.

The stereo-image processing unit 6 and the above-described far-infrared sensor 4 are connected to the pedestrian-determination unit 7. Therefore, the pedestrian-determination unit 7 determines whether or not the prospective pedestrian is a real pedestrian based on a temperature-detection value Tn (n=1 to 32) located in the same direction as the prospective pedestrian is extracted by the stereo-image processing unit 6. More specifically, the pedestrian-determination unit 7 compares the temperature-detection value Tn in each of temperature-detection directions detected by the thermal infrared elements 41 to the previous temperature-detection value Tn0 corresponding thereto and determines whether or not the current temperature-detection value Tn is higher than the previous temperature-detection value Tn0 by as much as a predetermined temperature (for example, two degrees or more) in any of the temperature-detection directions. If there is a temperature-detection direction in which the current temperature-detection value Tn is higher than the previous temperature-detection value Tn0 by as much as the predetermined temperature, the pedestrian-determination unit 7 determines that there is a high probability that the pedestrian exists in the temperature-detection direction. When the prospective pedestrian exists in the direction showing the high probability that the pedestrian object exists (the temperature-detection direction), the pedestrian-determination unit 7 determines (recognizes) the prospective pedestrian to be a real pedestrian.

The pedestrian determination performed by the pedestrian-determination unit 7 is carried out according to the flowchart illustrating the pedestrian-determination routine shown in FIG. 4, for example. The pedestrian-determination routine is performed at predetermined periods. When the pedestrian-determination routine is started, first, the pedestrian-determination unit 7 inputs the temperature-detection value Tn for each of the temperature-detection directions detected by the thermal infrared elements 41, at step S101.

At subsequent step S102, the pedestrian-determination unit 7 checks whether or not any pedestrian was recognized forward of the vehicle 1 by the previous processing. When it is determined that no pedestrians were recognized, the processing advances to step S103, all element flags Fn (n=1 to 32) are cleared (Fn←0), and processing further advances to step S106. Here, the term element flag Fn is a flag that is set to "1", when it is determined that the pedestrian exists in a temperature-detection direction of the thermal infrared element 41 corresponding to the element flag Fn. The element flag Fn is set, at step S106 that will be described later according to fluctuations in the temperature-detection value Tn obtained by the thermal infrared element 41.

On the other hand, when it is determined that the pedestrian was recognized through the previous processing, at step S102, the processing advances to step S104 and the pedestrian-determination unit 7 checks whether or not the current temperature-detection value Tn obtained by the thermal infrared element 41 corresponding to the previous pedestrian-determination direction approaches the previous temperature-detection value Tn0 corresponding thereto (where Tn0±one degree, for example). That is to say, there is a high probability that the pedestrian exists in the same direction the pedestrian was previously recognized. In that case, the temperature-detection value Tn corresponding to the direction in which the pedestrian exists will approach in value the previous temperature-detection value Tn0. When the pedestrian was detected through the previous recognition, the element flag Fn corresponding to the direction in which the pedestrian was detected is set to "1".

Subsequently, when the pedestrian-determination unit 7 determines that the temperature-detection value Tn obtained by the thermal infrared element 41 corresponding to the previous pedestrian-recognition direction approaches the previous temperature-detection value Tn0, the processing advances to step S105. Then, the pedestrian-determination unit 7 keeps the element flag Fn corresponding to the pedestrian-recognition direction at the level of "1" and clears the other element flags Fn. Then, the processing advances to step S106.

On the other hand, when the pedestrian-determination unit 7 determines that the temperature-detection value Tn obtained by the thermal infrared element 41 corresponding to the previous pedestrian-recognition direction is significantly different from the previous temperature-detection value Tn0, at step S104, the processing advances to step S103 and all flags are cleared.

When the processing advances from step S103 or step S105 to step S106, the pedestrian-determination unit 7 compares all the temperature-detection values Tn to the previous temperature-detection values Tn0 corresponding to the temperature-detection values Tn. Incidentally, the temperature-detection direction corresponding to the element flag Fn that is set to "1" is excluded from all of the other temperature-detection values Tn. Then, when any of the temperature-detection values Tn is higher than the previous temperature-detection value Tn0 by as much as a predetermined temperature (two degrees, for example), the pedestrian-determination unit 7 determines that there is a high probability that the pedestrian exists in the temperature-detection direction corresponding to such a temperature-detection value Tn and sets the corresponding element flag Fn to "1", whereby the processing advances to step S107. In general, the temperature of the pedestrian or the like is higher than the surrounding temperature. Therefore, when the vehicle 1 or the pedestrian moves and an object whose temperature is detected by the thermal infrared elements 41 is changed from a three-dimensional object other than the pedestrian to the pedestrian or the like, the temperature-detection value Tn corresponding to the pedestrian becomes higher than the previous temperature-detection value Tn0 by as much as a predetermined temperature. Therefore, when any temperature-detection value Tn higher than the previous temperature-detection value Tn0 by as much as the predetermined temperature exists, the pedestrian-determination unit 7 determines that there is a high probability that the pedestrian exists in the direction corresponding to the temperature-detection value Tn.

Then, the pedestrian-determination unit 7 checks whether or not the prospective pedestrian detected by the stereo-image processing unit 6 exists, at step S107. When the pedestrian-determination unit 7 determines that there is no prospective pedestrian, the pedestrian-determination routine is terminated. However, when the pedestrian-determination unit 7 determines that there is the prospective pedestrian, the processing advances to step S108.

When the processing advances from step S107 to step S108, the pedestrian-determination unit 7 calculates a temperature-detection direction of the far-infrared sensor 4 according to the position information of the prospective pedestrian in the real space. The temperature of the prospective pedestrian may be detected in the calculated temperature-detection direction. That is to say, the pedestrian-determination unit 7 calculates which one of the temperature-detection directions of the thermal infrared elements 41 corresponds to the prospective pedestrian according to the position information of the prospective pedestrian in the real space as determined by the camera signal.

Then, the processing advances to step S109 and the pedestrian-determination unit 7 checks whether or not the element flag Fn of the thermal infrared element 41 whose temperature-detection direction corresponds to the prospective pedestrian is set to "1". When the pedestrian-determination unit 7 determines that the element flag Fn is not set to "1", the pedestrian-determination routine is terminated.

On the other hand, when the pedestrian-determination unit 7 determines that the element flag Fn is set to "1" at step S109, the processing advances to step S110 and the pedestrian-determination unit 7 determines that the prospective pedestrian is the real pedestrian, whereby the pedestrian-determination routine is terminated.

As has been described in the above-described embodiment, three-dimensional objects are three-dimensionally recognized based on the couple of images obtained through the stereo image-pickup performed by the stereo camera 3 and the prospective pedestrian data is extracted from the recognized three-dimensional objects data. The far-infrared sensor 4 detects the temperature of the object outside the vehicle in a predetermined detection field overlapping the field of view of the stereo camera 3. It is determined whether or not the prospective pedestrian is a real pedestrian according to the temperature-detection value detected in the same direction as the prospective pedestrian. Thus, the above-described embodiment allows for the recognition of the pedestrian with high precision by using a simple system. That is to say, the pedestrian recognition is achieved by recognizing a three-dimensional object in a three-dimensional manner through the stereo camera 3 and recognizing the temperature of the three-dimensional object through the far-infrared sensor 4. Therefore, the above-described embodiment eliminates pedestrians having to take, for example, a portable transmitter-receiver with them and recognizes the pedestrian with increased precision through the simple system.

In that case, particularly when the prospective-pedestrian extraction is performed by using data on the widths of the three-dimensional objects in the real space by effectively using the data on the three-dimensionally recognized three-dimensional objects according to the couple of images obtained through the stereo image-pickup, a three-dimensional object such as the vehicle can be omitted from the choices of prospective pedestrians. Subsequently, when the far-infrared sensor 4 detects the temperature of exhaust gas discharged by the preceding vehicle or the like, for example, it becomes possible to prevent the preceding vehicle or the like from being erroneously recognized, as the pedestrian, based on the detected exhaust gas temperature.

The determination whether or not the pedestrian exists performed by using a temperature-detection value obtained by the far-infrared sensor 4 is carried out, based on the amount of a relative change in a temperature-detection value detected for each of the temperature-detection directions. Therefore, the pedestrian-existence determination can be performed in an appropriate manner according to fluctuations in the outside air temperature.

Further, in the above-described embodiment, the far-infrared sensor 4 using the thermal infrared elements 41, where each of the thermal infrared elements 41 is formed as a thermopile sensor for obtaining a plurality items of heat data through a thermocouple, detects the temperature outside the vehicle 1. However, without being limited to the above-described embodiment, the present invention may be achieved by detecting the temperature outside the vehicle by using the far-infrared sensor or the like using various types of infrared elements including a thermal infrared element formed as a bolometer sensor for detecting heat, as a change in resistance, a thermal infrared element formed as a pyroelectric sensor for detecting heat, as an electric charge, and so forth.

Further, the configuration of the far-infrared sensor is not limited to the above-described embodiment wherein the infrared elements are aligned, so as to correspond to predetermined temperature detection directions. On the contrary, a single infrared element may be provided to perform scanning in a horizontal direction, so as to correspond to the desired temperature-detection direction.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An outside-vehicle monitoring system comprising:
   a three dimensional visual light image-pickup device that generates a signal representative of an image of an object outside a vehicle by using solid state image pickup elements;
   a three-dimensional-object recognition processor that recognizes a three-dimensional object outside the vehicle by processing the signal representative of the image generated by the three dimensional visual light image-pick up device and detects a prospective pedestrian by extracting three-dimensional object data from the recognized three-dimensional object and comparing the extracted three-dimensional object data with a predetermined width-range;
   a plurality of thermal infrared elements that detect a temperature value of the recognized three dimensional object detected by the three dimensional visual light image-pickup device in a detection field overlapping a field of view of the three dimensional visual light image-pickup device, the plurality thermal infrared elements being arranged in a line along a width-direction of the vehicle; and
   a pedestrian-determination processor coupled to said three-dimensional-object recognition processor and said plurality of thermal infrared elements that determines whether the prospective pedestrian is an actual pedestrian according to fluctuations in the value of the detected temperature in a detection-direction at which the prospective pedestrian was detected,
   wherein the pedestrian-determination processor determines the prospective pedestrian is the actual pedestrian when the temperature-detection value detected by the plurality of thermal infrared elements in the detection direction is higher than a predetermined amount of the previous temperature-detection value detected by the plurality of thermal infrared elements in the detection-direction.

2. The outside-vehicle monitoring system according to claim 1, wherein the three dimensional visual light image-pickup device includes a pair of cameras for picking up the image of an object outside the vehicle from different points of view and the three-dimensional-object recognition processor three-dimensionally recognizes the three-dimensional object based on a couple of images of the same object picked up by the pair of cameras and extracts the prospective pedestrian.

* * * * *